(12) United States Patent
Wang et al.

(10) Patent No.: US 9,812,993 B2
(45) Date of Patent: Nov. 7, 2017

(54) SINGLE ELECTRODE TRIBOELECTRIC GENERATOR

(71) Applicants: Zhong Lin Wang, Atlanta, GA (US); Ya Yang, Atlanta, GA (US); Hulin Zhang, Atlanta, GA (US); Guang Zhu, Atlanta, GA (US)

(72) Inventors: Zhong Lin Wang, Atlanta, GA (US); Ya Yang, Atlanta, GA (US); Hulin Zhang, Atlanta, GA (US); Guang Zhu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 740 days.

(21) Appl. No.: 14/314,131

(22) Filed: Jun. 25, 2014

(65) Prior Publication Data

US 2014/0300248 A1    Oct. 9, 2014

Related U.S. Application Data

(63) Continuation-in-part of application No. 14/032,864, filed on Sep. 20, 2013, now Pat. No. 9,595,894.

(60) Provisional application No. 61/839,018, filed on Jun. 25, 2013, provisional application No. 61/704,138, filed on Sep. 21, 2012, provisional application No. 61/754,992, filed on Jan. 22, 2013, provisional application No. 61/870,388, filed on Aug. 27, 2013.

(51) Int. Cl.
*H02N 11/00* (2006.01)
*H02N 1/04* (2006.01)
*G01L 9/00* (2006.01)

(52) U.S. Cl.
CPC ............. *H02N 1/04* (2013.01); *G01L 9/0072* (2013.01)

(58) Field of Classification Search
CPC ......... H02N 11/00; H02N 11/002; H02N 1/04
USPC .................................................. 310/300, 309
See application file for complete search history.

(56) References Cited

U.S. PATENT DOCUMENTS

| | | | |
|---|---|---|---|
| 4,126,822 | A | 11/1978 | Wahlstrom |
| 4,990,813 | A | 2/1991 | Paramo |

(Continued)

OTHER PUBLICATIONS

Notification of related application: commonly owned U.S. Appl. No. 13/598,132, filed Aug. 29, 2012 by Wang et al. includes matter that may be related to the present invention.

*Primary Examiner* — Terrance Kenerly
(74) *Attorney, Agent, or Firm* — Bryan W. Bockhop; Bockhop Intellectual Property Law, LLC

(57) ABSTRACT

A triboelectric generator includes a first contact charging member, a second contact charging member and an electrical load. The first contact charging member has a contact side and an opposite back side. The first contact charging member includes a material that has a first rating on a triboelectric series and also has a conductive aspect. The second contact charging member has a second rating on the triboelectric series, different from the first rating, and is configured to come into contact with the first contact layer and go out of contact with the first contact layer. The electrical load electrically is coupled to the first contact charging member and to a common voltage so that current will flow through the load after the second contact charging member comes into contact with the first contact charging member and then goes out of contact with the first contact charging member.

18 Claims, 6 Drawing Sheets

(56) References Cited

U.S. PATENT DOCUMENTS

| | | | |
|---|---|---|---|
| 2006/0000502 A1* | 1/2006 | Fiorini | H01L 35/34 136/224 |
| 2006/0064826 A1 | 3/2006 | Kimball | |
| 2007/0057276 A1* | 3/2007 | Kiyoku | B82Y 20/00 257/103 |
| 2010/0133006 A1 | 6/2010 | Shakra et al. | |
| 2011/0050181 A1* | 3/2011 | Post | H02N 1/04 320/166 |
| 2011/0148248 A1* | 6/2011 | Landa | H01J 45/00 310/306 |

* cited by examiner

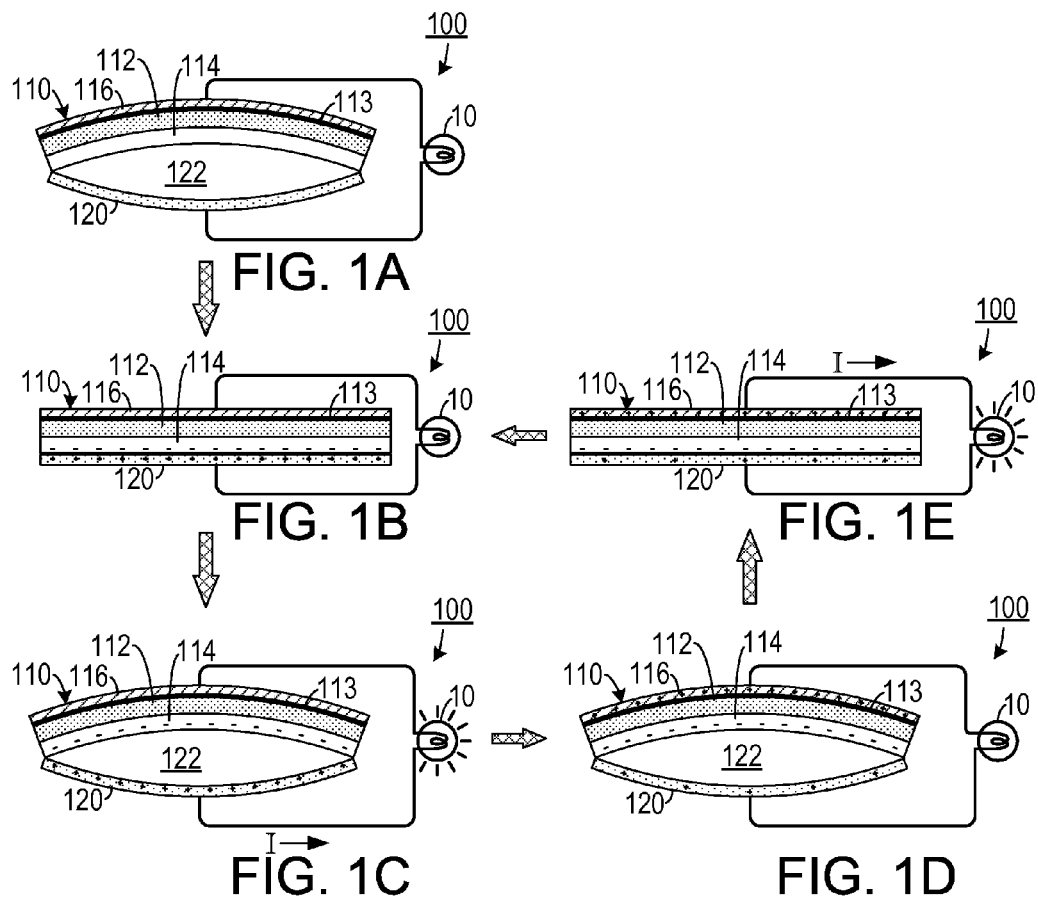
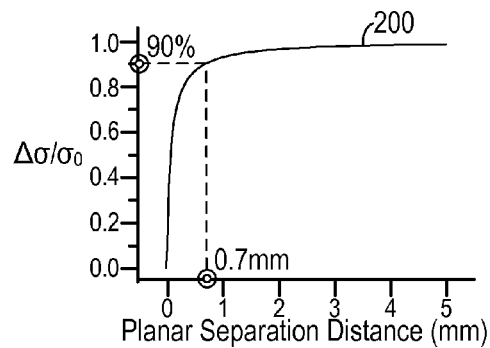
FIG. 2

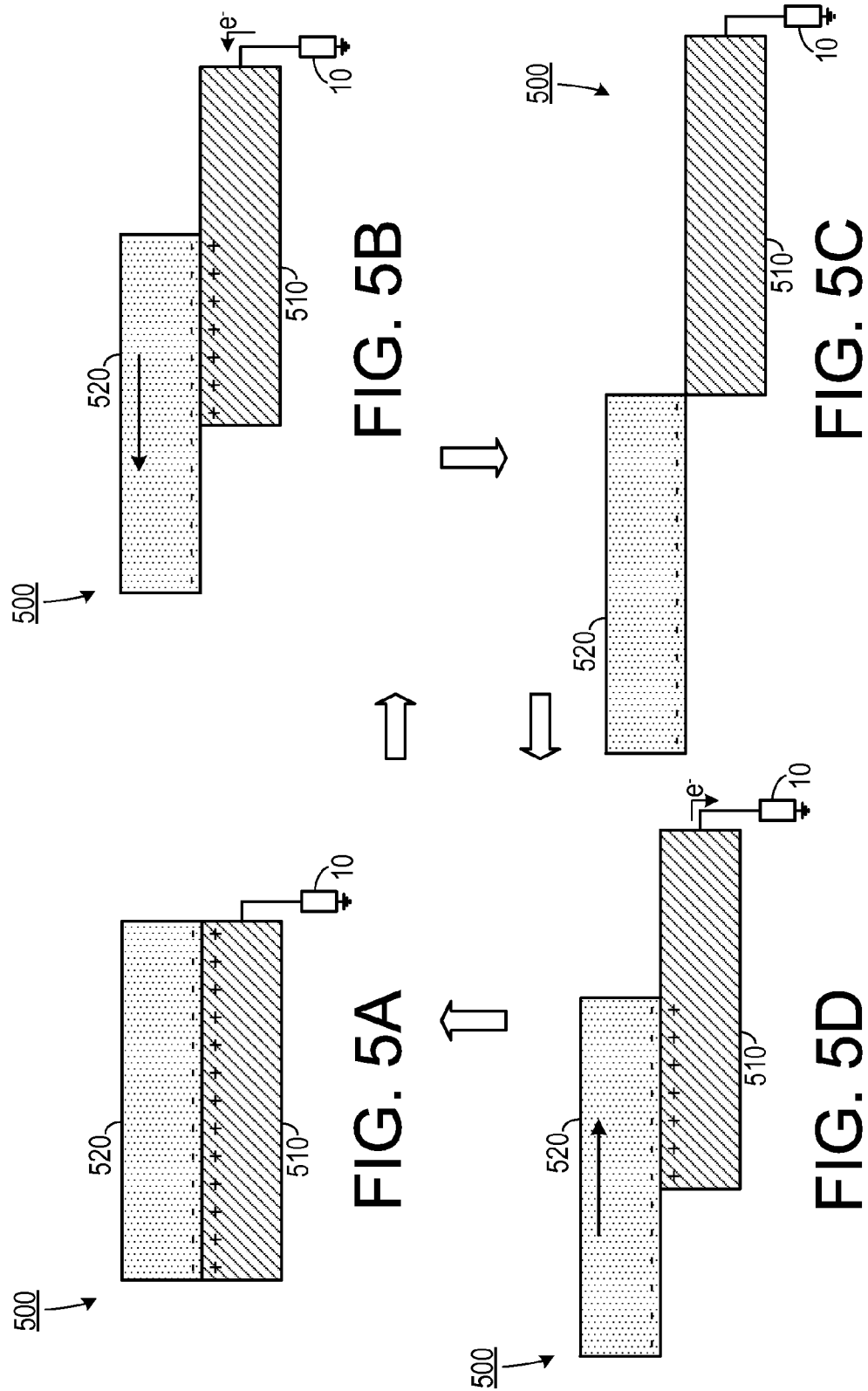

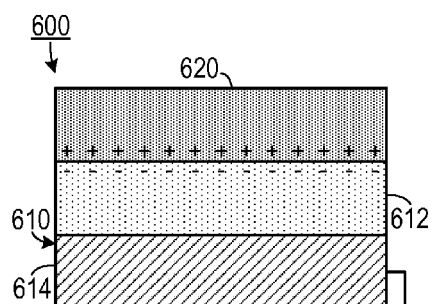
FIG. 6A
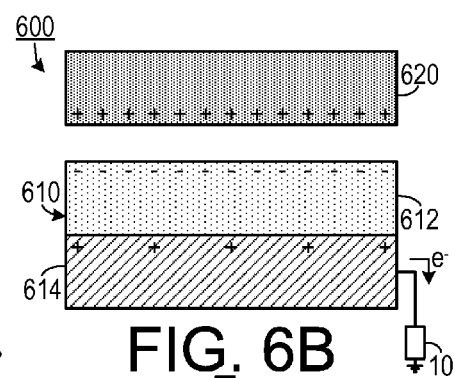
FIG. 6B
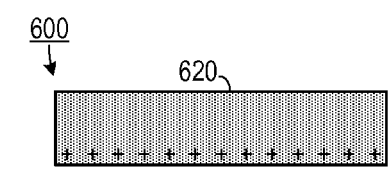
FIG. 6D
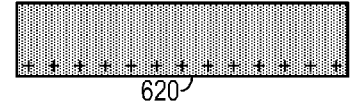
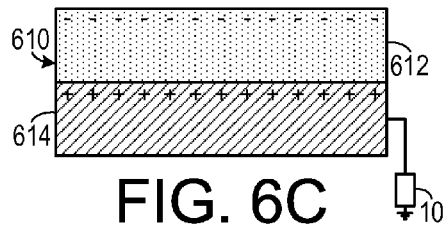
FIG. 6C
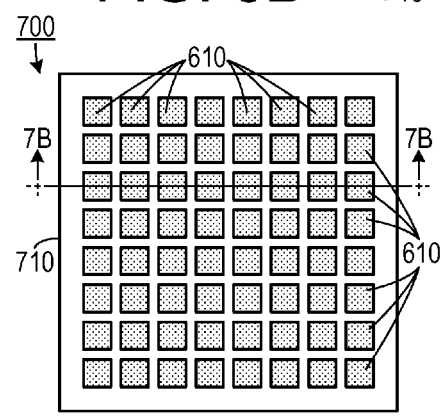
FIG. 7A
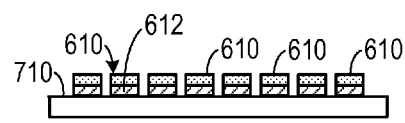
FIG. 7B

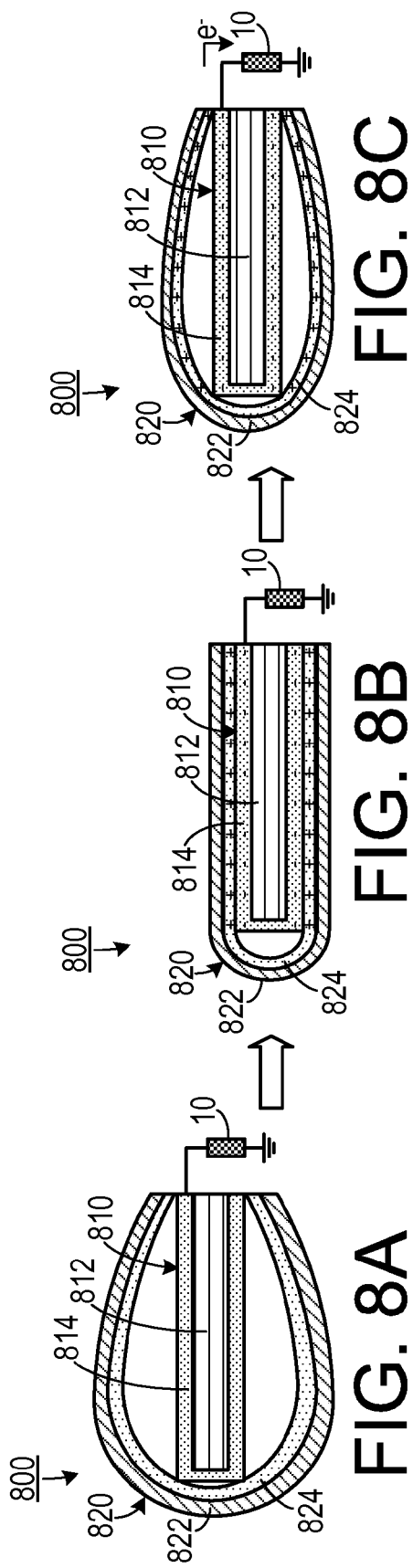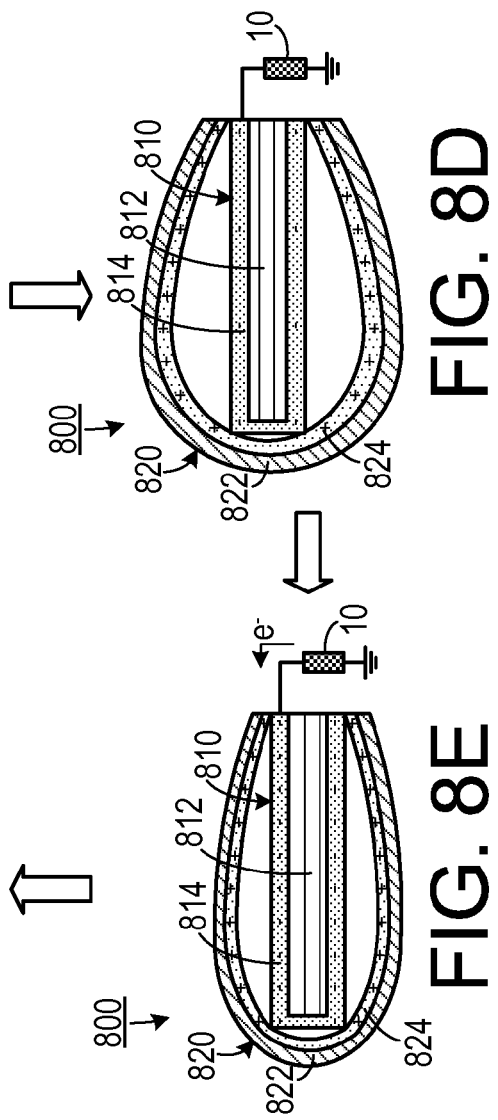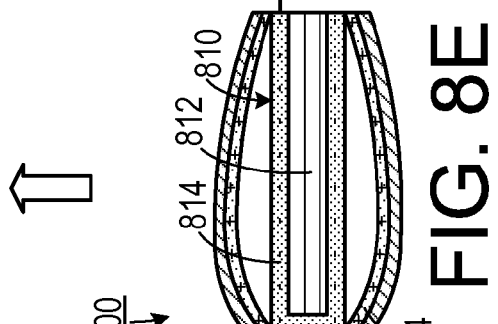

SINGLE ELECTRODE TRIBOELECTRIC GENERATOR

CROSS-REFERENCE TO RELATED APPLICATION(S)

This application claims the benefit of U.S. Provisional Patent Application Ser. Nos. 61/839,018, filed Jun. 25, 2013, and 61/870,388, filed Aug. 27, 2013, the entirety of each pf which is hereby incorporated herein by reference.

This application is a continuation-in-part of, and claims the benefit of, U.S. patent application Ser. No. 14/032,864, filed Sep. 20, 2013, which claims priority on U.S. Provisional Patent Application Ser. Nos. 61/704,138, filed Sep. 21, 2012, and 61/754,992, filed Jan. 22, 2013, the entirety of each of which is hereby incorporated herein by reference.

STATEMENT OF GOVERNMENT INTEREST

This invention was made with government support under agreement No. DE-FG02-07ER46394, awarded by the Department of Energy, and under agreement No. CMMI-0946418, awarded by the National Science Foundation. The government has certain rights in the invention.

BACKGROUND OF THE INVENTION

1. Field of the Invention

The present invention relates to electric power generators and, more specifically, to generators that derive power from mechanical contact between surfaces.

2. Description of the Related Art

Wireless, portable and multi-function electronic devices require independent and maintenance-free power sources. The emerging technologies for mechanical energy harvesting are effective and promising approaches for building self-powered systems, because of a great abundance of mechanical energy existing in the environment and the human body. Piezoelectric nanogenerators have been developed to convert tiny-scale mechanical energy into electricity. Another approach to providing power is though triboelectric nanogenerators based on the contact-electrification effect. Triboelectric nanogenerators harvest mechanical energy through a periodic contact and separation of two polymer plates. However, most triboelectric nanogenerators have limited power output.

Integration of pressure-sensitive components with an active-matrix, such as in an artificial electronic skin, is an important area of interest in the field of robotics. Existing systems, however, typically require external power sources, which can add to their complexity.

Therefore, there is a need for triboelectric nanogenerators with increased power output.

SUMMARY OF THE INVENTION

The disadvantages of the prior art are overcome by the present invention which, in one aspect, is a triboelectric generator that includes a first contact charging member and a second contact charging member. The first contact charging member includes a first contact layer and a conductive electrode layer. The first contact layer has a contact side and an opposite back side. The first contact layer includes a material that has a triboelectric series rating indicating a propensity to exchange electrons due to a contacting event. The conductive electrode layer is disposed along the back side of the contact layer. The second contact charging member is spaced apart from and disposed oppositely from the first contact charging member. The second contact charging member includes an electrically conductive material layer that has a triboelectric series rating indicating a propensity to exchange electrons when contacted by the first contact layer during the contacting event. The electrically conductive material layer is configured to act as an electrode. A mechanism is configured to maintain a space between the first contact charging member and the second contact charging member except when a force is applied thereto.

In another aspect, the invention is a triboelectric generating device that includes a first contact charging member and a second contact charging member. The first contact charging member includes a substrate layer having a first side and a second side, a first contact layer and a conductive electrode layer. The substrate layer is configured to maintain a concave shape unless a force is applied thereto. The first contact layer has a contact side and is affixed to the first side of the substrate layer. The first contact layer includes a material that has a triboelectric series rating indicating a propensity to gain electrons due to a contacting event. The conductive electrode layer is affixed to the second side of the substrate layer. The second contact charging member is spaced apart from and disposed oppositely from the first contact charging member. The second contact charging member includes an electrically conductive metal layer that has a triboelectric series rating indicating a propensity to lose electrons when contacted by the first contact layer. The second contact charging member defines a concave shape that is reflective of the concave shape of the substrate layer.

In another aspect, the invention is a triboelectric generating system that includes a first contact charging member, a second contact charging member and at least one spring. The first contact charging member, the first contact charging member includes a first rigid substrate, a conductive electrode layer disposed on the substrate and a first contact layer. The first contact layer is disposed on the conductive electrode layer and includes a material that has a triboelectric series rating indicating a propensity to gain electrons due to a contacting event. The second contact charging member is spaced apart from and disposed oppositely from the first contact charging member, and includes a second rigid substrate and an electrically conductive material layer. The electrically conductive material layer has a triboelectric series rating indicating a propensity to lose electrons when contacted by the first contact layer disposed on the second rigid substrate. The spring is configured to maintain space between the first contact charging member and the second contact charging member except when a force is applied thereto.

In another aspect, the invention is a triboelectric generator that includes a first contact charging member, a second contact charging member and an electrical load. The first contact charging member has a contact side and an opposite back side. The first contact charging member includes a material that has a first rating on a triboelectric series. The first contact charging member also has a conductive aspect. The second contact charging member has a second rating on the triboelectric series, different from the first rating, and is configured to come into contact with the first contact layer and go out of contact with the first contact layer. The electrical load electrically is coupled to the first contact charging member and to a common voltage so that current will flow through the load after the second contact charging member comes into contact with the first contact charging member and then goes out of contact with the first contact charging member.

In yet another aspect, the invention is a sensor system for sensing contact with a material that has a first rating on a triboelectric series. The sensor includes a planar substrate and an array of triboelectric sensor units disposed on the planar substrate.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 1A-E are a series of schematic views showing operation of a first embodiment of a triboelectric generator.

FIG. 2 is a graph relating charge density to separation distance.

FIG. 5A-5D are a series of schematic diagrams showing charge transport in a sliding embodiment of a single electrode triboelectric generator.

FIG. 6A-6D are a series of schematic diagrams showing charge transport in a vertical contact embodiment of a single electrode triboelectric generator.

FIG. 7A is a schematic view of an array of triboelectric sensors.

FIG. 7B is a cross-sectional view of the embodiment shown in FIG. 7A, taken along line 7B-7B.

FIG. 8A-8E are a series of schematic diagrams of a two-sided single electrode triboelectric generator.

DETAILED DESCRIPTION OF THE INVENTION

Figure 3:
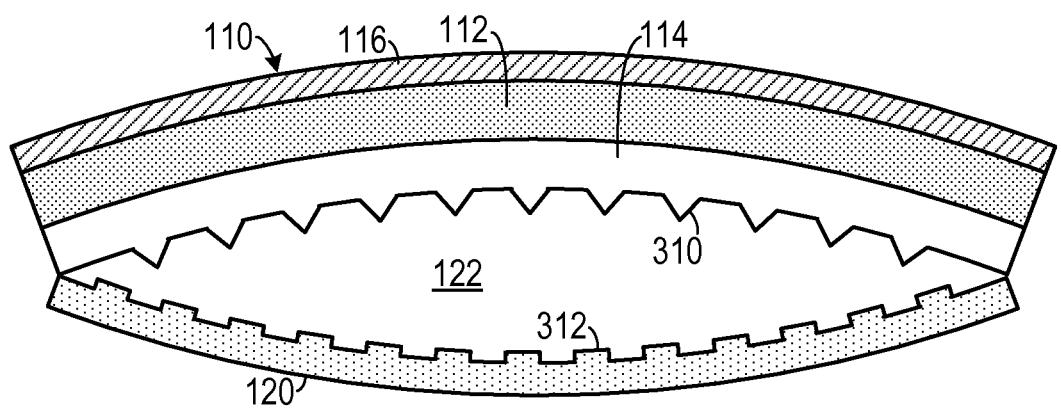
FIG. 3 is a schematic view showing a triboelectric generator with patterned surfaces.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 13/598,132, filed on Aug. 29, 2012 by Wang et al. discloses methods of making triboelectric generators and components thereof and is incorporated herein by reference for the purpose of disclosing such methods.

As shown in FIG. 1A, one embodiment of a triboelectric generator 100 includes a first contact charging member 110 that has a first substrate material layer 112, which could include poly(4,4'-oxydiphenylene-pyromellitimide) (which is sold under the trademark "Kapton"), adjacent to a second substrate material layer 113, which can include a material such as $SiO_2$. The first contact charging member 110 also includes a first contact layer 114, which could include, for example, PDMS, PTFE, FEP, PVC, and a Polyimide, or any material that has a triboelectric series rating indicating a propensity to gain electrons due to a contacting event. The first substrate material layer 112 and the second substrate material layer 113 are applied to each other at an elevated temperature and then cooled so that differential shrinkage during cooling causes the contact charging member to have a concave shape. The first substrate material layer 112 can include a polymer sheet having a first thermal expansion coefficient and the second substrate material layer 113 can include a ceramic film having a second thermal expansion coefficient that is less than the first thermal expansion coefficient. A second contact charging member 120 includes an electrically conductive metal layer (which could include a material such as aluminum, a metal or a conductive polymer) that has a triboelectric series rating indicating a propensity to lose electrons when contacted by the first contact layer 114. The second contact charging member 120 defines a concave shape that is reflective of the concave shape of the substrate layer so that when the second contact charging member 120 is placed adjacent to the first contact layer 114, the two layers define a space 122 therebetween unless a force is applied to the layer to bring them together. A first conductive electrode 116, which is applied to the second substrate material layer 113, and the second contact charging member 120, which acts as an electrode as a result of its conductivity, can be coupled to a load 10 to apply current thereto.

As shown in FIGS. 1B-1E, triboelectric nanogenerator 100 generates current by applying a cycled compressive force onto the whole area of the device, so that the bending plates will be periodically pressed to flatten and contact closely with each other, as shown in FIG. 1B. Once released, as shown in FIG. 1C, the two plates will separate apart due to the stored elastic energy and revert instantaneously back to their original arch shape due to resilience. A cycled generation of the potential difference between the two electrodes 112 and 120 drives the flow of electrons through the load 10. At the original state before the contact of the triboelectric films (as shown in FIG. 1A), there is no charge transferred, thus no electric potential. Upon the pressing of the two films towards each other, they will be brought fully into surface contact (as shown in FIG. 1B) and possibly relative sliding would occur, which results in electrons being transferred from a material in the positive side of the triboelectric series to the one in the negative side in the series. Accordingly, electrons will be injected from the aluminum surface 120 to PDMS surface 114, leaving positive charges on aluminum foil 120. The positive triboelectric charges on the conductive aluminum foil 120 attract the electrons in the opposite electrode to flow through the external load 10. After cycles of deformation, when the device is press and the surfaces with charges are in close contact with each other, all of the triboelectric charges will stay on the inner surfaces with the same surface density (σ0). Once the pressing force is released, the triboelectric nanogenerator 100 will immediately rebound back to its original arch shape due to the elasticity of the film so that a gap 122 will form again between the two plates, as shown in FIG. 1C. The electric field generated by the separated surface charges will then give rise to a much higher potential on the aluminum foil side 120 than the top electrode 116. Such a potential difference will drive the flow of positive charges from aluminum foil to the top electrode through the external load 10 until the potential difference is fully offset by the transferred charges, rendering the top electrode with a surface charge density of ($\Delta\sigma$), while the aluminum electrode 120 is left with ($\sigma 0 - \Delta\sigma$), as shown in FIG. 1D. Subsequently, when the triboelectric nanogenerator is pressed again to reach the close contact of the two plates, as shown in FIG. 1E, these redistributed charges will inversely build a positive potential on the top electrode 116, which will drive all of the transferred charges ($\Delta\sigma$) to flow back to the inner surface of the aluminum foil 120. Then a cycle is achieved and the device will go back to the equilibrium state depicted in FIG. 1B.

Both the voltage and current outputs are related to the amount of charges transferred (A$\Delta\sigma$, A surface area of the plate), which is determined by the triboelectric charge density ($\sigma 0$) and the separation distance of the two plates. The results of an analytical calculation 200 based on a simplified model of quasi-infinite flat plates, indicates the magnitude of the distance required for the optimum output, as shown in FIG. 2. When the separation distance starts to increase from 0 to 0.7 mm, $\Delta\sigma$ keeps a very rapid increase from 0 to ~90% of $\sigma 0$. Then, the slope of this curve starts to decrease. Thus, both an intimate contact and a subsequent separation of nearly 1 mm result in the phenomenal transferring of charges.

In one experimental embodiment, the electric output measurement was performed on an arch-shaped triboelectric nanogenerator device in a size of 3 cm×2.8 cm, with the triggering frequency of 6 Hz and controlled amplitude. Since the accumulation of the triboelectric charges increases and reaches equilibrium in a certain period of time after multiple cycles, the output will gradually go up in the first stage upon deformation. Then, the open-circuit voltage (VOC) will stabilize at 230 V, measured by an electrometer with infinite input resistance. When the bottom Al is connected to the positive probe of the electrometer, upon the release of the pressing force a positive voltage is generated because of the immediate charge separation. Since the electrons cannot flow in an open-circuit condition, the voltage will hold at a plateau unless there is a quick leakage. The peak value of the short-circuit current (ISC) reaches 94 μA, corresponding to the half cycle of pressing that is in higher straining rate than releasing. The integration of the each current peak gives the total charges transferred in a half cycle of deformation. Moreover, when the connection polarity to the electrometer is switched, both the voltage and current signal will be completely reversed. The gap from the arch-shaped structure is an important factor for the enhanced output, because without the SiO2-film-introduced bending, there will be much smaller and unstable electrical output.

As shown in FIG. 3, the triboelectric effect can be enhanced by using texture patterned surfaces on the first contact layer 114 and the second contact layer 120. For example the surfaces can employ an array of pyramid structures 310 or an array of box-like structures 312, or a combination of these structures or one of many other shaped structures formed in the surfaces.

Fabricating one experimental embodiment began with photolithographic patterning of 4 in. (100) Si wafers with thermally grown $SiO_2$ on top. The patterned wafer with the array of square window openings was firstly etched by buffered-oxide-etching process to transfer the pattern onto the $SiO_2$ layer. Then, the wafer was etched in KOH solution to fabricate the recessed features of pyramid. After cleaned with acetone, isopropanol and ethanol in sequence, the Si molds were treated with trimethylchlorosilane (Sigma Aldrich) by gas phase silanization to enable the easy peel-off of the PDMS film from the Si mold in the following step. In preparing the patterned PDMS film, the elastomer and the cross-linker (Sylgard 184, Dow Corning) were mixed in a 10:1 ratio (w/w), and then casted on the Si mold. After the degassing process under the vacuum, the mixture was spin-coated on the Si mold at 500 rpm for 60 s. After the thermally curing process at 85° C. for 1 hour, the PDMS inked with pyramid patterns was peeled off from Si mold. The surface without patterns were glued to the inner surface of the bending Kapton substrate.

The triboelectric nanogenerator can be integrated with a battery, such as a lithium ion battery. In assembling such an embodiment, two different slurries for the two working electrodes were made, which contain 70 wt % active material ($LiCoO_2$ for cathode and graphite for anode), 10 wt % carbon black powders as conductor, 20 wt % polyvinylidene fluoride (PVDF) binder and N-methyl-2-pyrrolidone (Sigma Aldrich) as the solvent. Then the slurries were cast onto the current collectors (Al foil for cathode and Cu foil for anode) respectively with a uniform thickness of 10 μm. The electrodes were baked at 110° C. under vacuum for 12 hours. Stainless-steel coin cells were used for the battery assembly. The cathode and anode electrodes were stacked with a piece of polyethylene (PE) separator (MTI Corporation) in between. After the system was filled with electrolyte (1M LiPF6 in 1:1:1 ethylene carbonate: dimethyl carbonate: diethyl carbonate, Novolyte Technologies), the coin-cell was finally sealed.

In another embodiment of a triboelectric nanogenerator 400, as shown in FIGS. 4A-4D, the first contact charging member 410 includes a first rigid substrate 412 to which a conductive electrode layer 414 is applied. The first rigid substrate 412 can include a material such as polymethyl methacrylate (PMMA). The conductive electrode layer 414 can include, for example, a material such as gold, a metal, ITO, or a conducting polymer. A first contact layer 416 is applied to the conductive electrode layer 414. The first contact layer 416 is made from a material that has a triboelectric series rating indicating a propensity to gain electrons due to a contacting event, such as, for example, PDMS, PTFE, FEP, PVC, or a polyimide. A second contact charging member 420 includes a second rigid substrate 422, which can include can include a material such as polymethyl methacrylate (PMMA). An electrically conductive material layer 423 is applied to the second rigid substrate 422. Electrically conductive material layer 423 has a triboelectric series rating indicating a propensity to lose electrons when contacted by the first contact layer 416. In one representative embodiment, the electrically conductive material layer 423 includes a gold film 424 and a plurality of gold nanoparticles 426 disposed thereon on. One or more springs 430 maintain a space 432 between the first contact charging member 410 and the second contact charging member 420 except when a force is applied thereto. The springs 430 may be held in place by receptacles 434 defined by the rigid substrates 412 and 422.

Figure 4A:
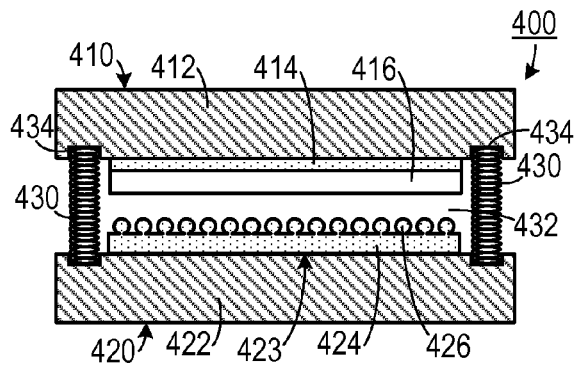
FIG. 4A is a schematic side view of a second embodiment of a triboelectric generator.
Figure 4C:
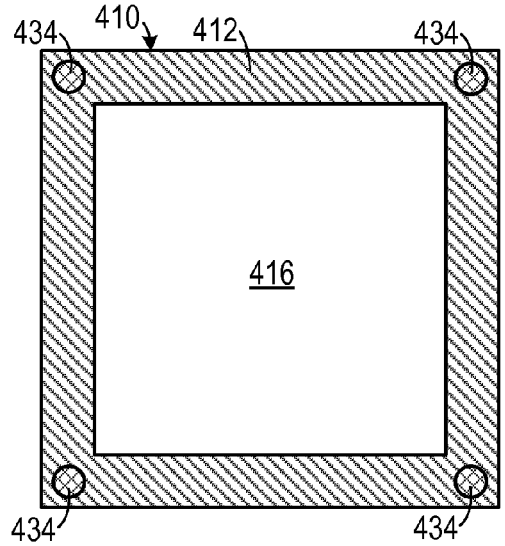
FIG. 4C is a schematic plan view of a first contact charging member employed in the embodiment shown in FIG. 4A.
Figure 4B:
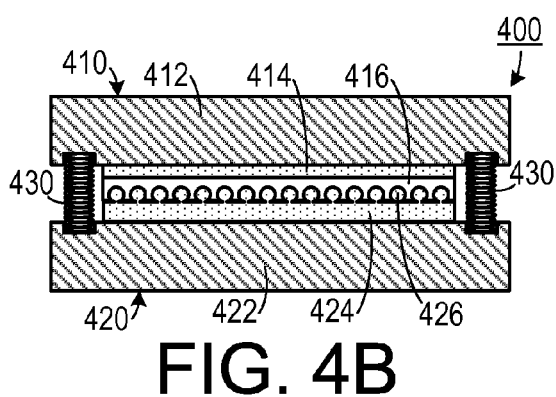
FIG. 4B is a schematic side view of the embodiment shown in FIG. 4A when compressed by an activating force.
Figure 4D:
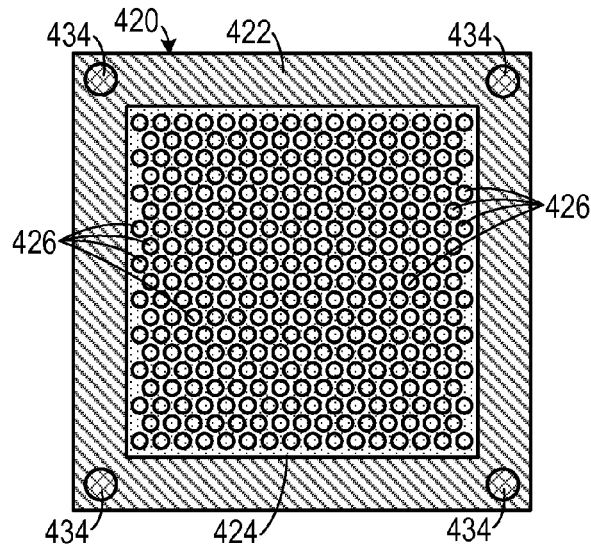
FIG. 4D is a schematic plan view of a second contact charging member employed in the embodiment shown in FIG. 4A.

Compression of the first contact charging member 410 and the second contact charging member 420 is shown in FIG. 4B. The use of nanoparticles 426 increases the contact are substantially, increasing the triboelectric effect. This embodiment of a triboelectric nanogenerator 400 offers a substantially higher power output due nanoparticle 426- based surface modification. In one experimental embodiment, short-circuit current reached a peak value of 2.0 mA, which corresponded to the instantaneous power output of 1.2 W and power density of 322.7 W/m². Average power output and energy conversion efficiency at device level was calculated to be 132 mW and 9.8%, respectively. This embodiment also realized scaling up of nanogenerator power output, making it power not just a single electronic device but hundreds of them simultaneously. Triggered by a commonly available mechanical source such as footfalls, the nanogenerator was capable of instantaneously lighting up 600 commercial LED lamps in real time. This indicates the practicability of harvesting mechanical energy by the nanogenerator on a large scale. The working mechanism demonstrated here can be further applied to potentially harvest large-scale mechanical energy such as from rolling wheels, wind power, and ocean waves.

In one experimental embodiment, the nanogenerator has a layered structure with two substrates. Polymethyl methacrylate (PMMA) was selected as the material for substrates due to its decent strength, light weight, easy processing, and low cost. On the lower side, a layer of contact electrode is prepared. The contact electrode plays dual roles of electrode and contact surface. It consists of a gold thin film and gold nanoparticles coated on the surface. Alternatively, nanoparticles of non-precious metals can also be used as replacements. They modify the surface both physically and chemically. On the other side, a thin film of gold is laminated between the substrate and a layer of polydimethylsiloxan (PDMS). This electrode is referred to as the "back electrode" for later reference. The two substrates are connected by four springs installed at the corners, leaving a narrow spacing between the contact electrode and the PDMS.

The electric energy generation process can be explained by the coupling between triboelectric effect and electrostatic effect. At the original position, a separation distance is maintained by springs. When an external impact is applied onto one of the substrates, the gold and PDMS are brought into contact. According to the triboelectric series that ranks materials' tendency to gain or lose electrons, electrons are injected from gold into PDMS, resulting in surface triboelectric charges, which are retained on the PDMS. As the impact is withdrawn, the contacting surfaces move apart due to restoring force from the springs. Once a separation forms, the back electrode possess a higher electric potential than the contact electrode, producing an electric potential difference. Such a potential difference drives electrons through external loads and screens the positive triboelectric charges on the contact electrode. When the nanogenerator reverts back to the original position, positive triboelectric charges on the contact electrode are completely screened, leaving equal amount of inductive charges on the back electrode. Subsequently, mechanical impact once again shortens the separation, producing an electric potential difference with reversed polarity. In consequence, electrons flow in a reversed direction. They keep screening inductive charges on the back electrode until a direct contact is again established. The insulating PDMS allows long-time retention of the triboelectric charges on its surface even through the triboelectric charges on the metal side are periodically screened by inductive charges. In this process, the nanogenerator acts as an electron pump that drives electrons back and forth between the two electrodes.

The nanogenerator's electric output is strongly related to the contacting force, yielding higher output with larger force. At a force as small as 10 N, the nanogenerator can still produce $I_{sc}$ ranging from 160 μA to 175 μA. When the force increases to 500 N, the electric output reaches a saturated value, producing a peak $I_{sc}$ of 1.2 mA. This result is due to increased contact area with larger force. The two contacting surfaces are neither absolutely flat nor smooth. Surface roughness may be caused by inherent curvature of the substrates, nanoparticle modification, and fabrication defects such as particle contamination from the air. At small contacting force, the surface roughness prevents fully intimate contact between the contact electrode and the PDMS, leaving some areas untouched. With increased force, due to elastic property, the PDMS can deform and fill more vacant space, thus leading to larger contact area. As a result, the electric output increases until all the vacant space is completely filled by the PDMS, reaching a saturated limit.

As an important figure of merit, energy conversion efficiency of the nanogenerator was calculated. The conversion efficiency is defined as the ratio between the electric energy that is delivered to load by the nanogenerator and the mechanical energy the nanogenerator possesses. FIG. 4a is a current pulse output produced by human footfall at load resistance of 1 MΩ. The time span between $t_1$ and $t_2$ represents a single contact. With an external load of pure resistance, the electric energy delivered by the nanogenerator is equal to the Joule heating energy, which is presented below.

$$E_{electric} = Q = \int_{t_1}^{t_2} I^2 \cdot R \cdot dt = R \int_{t_1}^{t_2} I^2 \cdot dt = 1 \times 10^6 (\Omega) \cdot \int_{22.7144}^{22.7200} I^2 \cdot dt = 0.74 \text{ mJ} \quad (1)$$

where Q is the Joule heating energy, I is the instantaneous current, and R is the load resistance. Consequently, the average power output ($W_{average}$) can be obtained by $$W_{average} = \frac{E_{electric}}{t_2 - t_1} = \frac{0.74 \text{ mJ}}{(22.7200 - 22.7144)\text{s}} = 132.1 \text{ mW}$$

As soon as the mechanical energy is introduced, it presents in two forms, i.e. elastic energy stored in the springs and kinetic energy carried by a moveable substrate of the nanogenerator. The elastic energy is later released without converting into electric energy, which is calculated by $$E_{elastic} = \frac{1}{2} \cdot k \cdot x^2 \cdot N = 2.56 \text{ mJ} \quad (2)$$

where k is the spring constant (k=1278.88 N/m), x is the displacement of a spring that is equal to the spacing between the two contacting surfaces (x=1 mm), and N is the number of springs (N=4).

For kinetic energy, at the moment when the two substrates make a contact, it completely transforms to other forms, including electric energy and thermal energy. It can be calculated by the following equation.

$$E_{kinetic} = \frac{1}{2} \cdot m \cdot v^2 = 4.97 \text{ mJ} \quad (3)$$

where m is the mass of the moveable substrate (m=13.45 g, the mass of gold thin film and PDMS layer are negligible), and the v is the velocity of the substrate when a contact is just about to be made (v=0.86 m/s).

Therefore, the energy conversion efficiency ($\eta$) is calculated as $$\eta = \frac{E_{electric}}{E_{mechanical}} \times 100\% \quad (4)$$

$$= \frac{E_{electric}}{E_{elastic} + E_{kinetic}} \times 100\%$$

$$= \frac{0.74 \text{ mJ}}{2.56 \text{ mJ} + 4.97 \text{ mJ}}$$

$$= 9.8\%$$

It is to be noted that the above result is the overall efficiency at device level. However, at conversion process level, the elastic energy stored in the springs does not participate in energy conversion. Therefore if we solely take into account the kinetic energy that actually partially converts to electric energy, the direct efficiency at conversion process level is $$\eta_{direct} = \frac{E_{electric}}{E_{kinetic}} \times 100\% = \frac{0.74 \text{ mJ}}{4.97 \text{ mJ}} \times 100\% = 14.9\% \quad (5)$$

The unprecedentedly high power output of the nanogenerator is mainly attributed to three factors. Firstly, the contact electrode plays dual roles of electrode and contacting surface. Compared to previously reported designs in which both of the contacting surfaces are made of polymers, more inductive charges will be generated for the new design. Secondly, the elastic property of PDMS enables conformal contact despite of surface roughness. The PDMS can easily deform in response to small pressure and fill the otherwise vacant space that result from substrate curvature and fabrication defects. The tolerance on surface roughness ensures as much contact area as it can be possibly obtained. Also, the surface modification by gold nanoparticles plays an important role for the output enhancement. It can offer five-fold increase on the current output compared to the device without modification. Physically, the bumpy surface of the nanoparticle provides a larger contact area than a flat surface does. Chemically, the as-synthesized gold nanoparticles are positively charged in nature. The pre-carried positive charges may be able to add up with triboelectric charges upon contact, leading to a largely enhanced surface charge density and thus a substantially higher electric output.

In one experimental embodiment, the following fabrication methods were employed.

Materials: Hexadecyltrimethylammonium bromide (≥99%) was purchased from Sigma. Sodium tetrachloroaurate dihydrate (99%) and 1,4-Benzenedithiol (99%) were purchased from Aldrich. Hydrazine hydrate solution (78-82%) was purchased from Sigma-Aldrich. Deionized water was obtained using a ultrapure (18.2 MΩ-cm) system.

Synthesis of gold nanoparticles: A solution (50 mL) containing Sodium tetrachloroaurate dihydrate (1 mM) and hexadecyltrimethylarnmonium bromide (10 mM) was brought to a vigorous boil with stirring in a round-bottom flask fitted with a reflux condenser; Hydrazine hydrate solution (20 µL) was then added rapidly to the solution. The solution was heated under reflux for another 8 min, during which time its color changed from pale yellow to pale red. The solution was cooled to room temperature while stirring continuously. The average size (56 nm) of the synthesized gold nanoparticles was verified through SEM analysis.

Self-assembly of gold nanoparticles onto Au thin film: Au films were derivatized by immersion in a solution of 1,4-benzenedithiol for 12 h and rinsed with methanol and then water. The derivatized Au films were then immersed in a solution of gold nanoparticles for 12 hours to allow for complete adsorption of a single gold nanoparticle layer. Before the SEM characterization and electrical measurement, non-adsorbed gold nanoparticles were removed by rinsing with water.

Fabrication of the triboelectric nanogenerator: To fabricate the nanogenerator, two pieces of cast acrylic glass were prepared as substrates with dimensions of 3 inch by 3 inch by 3/32 inch. Four half-thorough holes were drilled at corners as houses for spring installation. 50 nm of gold was deposited on both of the substrates by e-beam evaporator (2 inch by 3 inch). On one of the substrates, fluid PDMS that consisted of base and curing agent in a ratio of 5:1 was spin-coated to form a 10 µm-thick layer. Then it was cured at 100° C. for 45 minutes. On the other substrate, gold nanoparticles were uniformly distributed on gold surface by self-assembly. Subsequently, four springs (spring constant=7.3 lb/inch) were installed in the houses to connect the two substrates together, leaving a spacing of 1 mm between the gold and the PDMS. The spacing is required to be substantially larger than the polymer thickness to ensure effective generation of inductive charges. Finally, conducting wires were connected to the two metal layers as leads for subsequent electric measurement or for connection to an external load.

As shown in FIGS. 5A-5D, one single electrode embodiment of a nanogenerator 500 includes a first contact charging member 510 and a second contact charging member 520. The first contact charging member 510 includes a conductive material that has a first rating on a triboelectric series (for example, aluminum, ITO, a conductive polymer, a conductive ceramic, etc.). The second contact charging member 520 has a second rating on the triboelectric series that is different from the first rating and includes a dielectric material (for example, PTFE, PDMS, FEP, PVC, Polyimide, etc.). In one embodiment, the first contact charging member 510 is made of aluminum and the second contact charging member 520 is made of PTFE. An electrical load 10 electrically couples the first contact charging member 10 and to a common voltage, such as a ground, a metal plate or another source of freely mobile charges.

This embodiment can work either by the second contact charging member 520 being slid in and out of contact with the first contact charging member 510, or it can be vertically lifted to bring it in and out of contact with the first contact charging member 510. When slid, if the initial state is that the second contact charging member 520 is placed in contact with the first contact charging member 510, as shown in FIG. 5A, the triboelectric effect will cause the transfer of electrons from the first contact charging member 510 to the second contact charging member 520 and the system will be in charge equilibrium. When the second contact charging member 520 is slid away from the first contact charging member 510, as shown in FIG. 5B, the second contact charging member 520, which has low charge mobility, will retain its extra electrons. However, electrons from the ground will flow through the load 10 into the conductive first contact charging member 510 to keep the system in equilibrium. When the second contact charging member 520 is fully away from the first contact charging member 510, the first contact charging member 510 will be neutral However, as the second contact charging member 520 slides back onto the first contact charging member 510, a reverse current will flow out through the load 10 to ground so as to keep the charges balanced. This cycle can be repeated to generate an alternating current.

In another embodiment of a triboelectric generating unit 600, as shown in FIGS. 6A-6D, the first contact charging member 610 can include a conductive electrode layer 614 (which could be a material such as ITO, for translucent embodiments, or another conductive material) upon which is deposited a first triboelectric material layer 612 (which could be a material such as PDMS, or one of the many other materials that exhibit triboelectric properties). The second contact charging member 620 could be one of many materials having a different rating on the triboelectric series which could even be human skin in a touch screen embodiment). While FIGS. 6A-6D show this embodiment being operated in a vertical contact mode, it could also be configured to operate in sliding mode.

In an embodiment suited for use as a touch screen sensor, as shown in FIGS. 7A-7B, an array of triboelectric generating (sensor) units 600 of the type disclosed above may be formed on a planar substrate 710. If the substrate 710 is made from a transparent sheet, if ITO is used as the conductive electrode layer 614 and if PDMS is used as the first triboelectric material layer 612, then the system will be transparent and can be used as a sensor array for a touch screen. Each sensor unit 600 can be coupled to a different load (not shown) which can detect the presence of something touching it (either by sliding over it or taping it). Forming micro-pyramidal structures on the surface of the first triboelectric material layer 612 can increase the efficiency of the system.

Another embodiment of a single electrode triboelectric generator 800 is shown in FIGS. 8A-8E. In this embodiment, the first contact charging member includes a central structure 810, which includes planar dielectric core structure 812 (which could be made from acrylic, for example) and a conductive layer 814 (such as aluminum, for example) that envelops a portion of the planar dielectric core structure 812 and to which the load 10 is coupled. The second contact charging member 820 includes a flexible substrate layer 822 (which could include a polyimide film such as Kapton®) to which the second triboelectric material layer 824 (which could be a material such as a polyamide film, for example) is applied.

As shown in FIG. 8A, the flexible substrate layer 822 has a horse shoe-shaped at a rest state in which the second triboelectric material layer 824 is not in contact with the conductive layer 814. When an external force (e.g., a squeezing force) is applied to the flexible substrate layer 822, as shown in FIG. 8B, the second triboelectric material layer 824 is placed in contact with the conductive layer 814, which causes triboelectric charge transfer. When the force is released, as shown in FIG. 8C, the influence of the positive charges held by the second triboelectric material layer 824 on the conductive layer 814 is reduced, thereby releasing electrons to flow through the load 10 to ground. When the flexible substrate layer 822 is fully released, as shown in FIG. 8D, the system returns to equilibrium and no current flows through the load 10. Applying a renewed force to the flexible substrate layer 822, as shown in FIG. 8E, increases the influence of the charges retained by the second triboelectric material layer 824 on the conductive layer 814, which causes a reverse current to flow through the load 10 until the second triboelectric material layer 824 is in contact with the conductive layer 814, as shown in FIG. 8B, which causes the system to return to equilibrium. As this sequence repeats itself, an alternating current is generated.

Applying a nanoscale texture to any of the exterior surfaces of the triboelectric layers in the embodiments discussed above can result in greater or more efficient triboelectric charge transfer. Such textures can be applied in one of many ways, including using lithographic techniques, sputtering, molding, etc. In one embodiment, to increase the triboelectric charge density on a triboelectric surface (e.g., a surface of a FIFE film), the surface can be dry-etched using inductively coupled plasma (ICP) to create nanoparticle structures on the surface. In one experimental embodiment, nanoparticle structures with an average diameter of about 200 nm were applied to a triboelectric surface of one of the contact members using this method.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A triboelectric generator, comprising:
   (a) a first contact charging member having a contact side and an opposite back side, including a material that has a first rating on a triboelectric series, the first contact charging member also having a conductive aspect;
   (b) a second contact charging member that has a second rating on the triboelectric series, different from the first rating, and configured to come into contact with the first contact charging member and go out of contact with the first contact charging member; and
   (c) an electrical load electrically coupled to the first contact charging member and to a common voltage so that current will flow through the load after the second contact charging member comes into contact with the first contact charging member and then goes out of contact with the first contact charging member,
   wherein at least one of the first contact charging member and the second contact charging member has an outer surface that comprises a film on which a plurality of nanoparticles is disposed wherein the film includes a first composition and wherein the nanoparticles include the first composition.

2. The triboelectric generator of claim 1, wherein the first contact charging member comprises a conducting material layer and wherein the second contact charging member comprises a dielectric material.

3. The triboelectric generator of claim 2, wherein the metal comprises aluminum and the dielectric material comprises a material selected from a group consisting of: PDMS, PTFE, FEP, PVC, Polyimide and combinations thereof.

4. The triboelectric generator of claim 1, wherein the second contact charging member is configured to slide laterally with respect to the first contact charging member.

5. The triboelectric generator of claim 1, wherein the first contact charging member comprises:
   (a) a conductive electrode layer coupled to the electrical load; and
   (b) a first triboelectric material layer disposed on the conductive electrode layer.

6. The triboelectric generator of claim 5, wherein the first triboelectric material layer comprises a material selected from a group consisting of: PDMS, PTFE, FEP, PVC, Polyimide and combinations thereof.

7. The triboelectric generator of claim 5, wherein the conductive electrode layer comprises ITO.

8. The triboelectric generator of claim 1, wherein the second contact charging member comprises human skin.

9. The triboelectric generator of claim 1, wherein the first contact charging member comprises a planar dielectric core structure and a conductive layer enveloping at least a portion of the planar dielectric core structure, the load electrically coupled to the conductive layer wherein the conductive layer includes a first triboelectric material that has the first rating on the triboelectric series; and wherein the second contact charging member comprises a flexible substrate layer and a second triboelectric material layer disposed on the flexible substrate layer, the second triboelectric material layer having the second rating, the flexible substrate layer wrapped about a portion of the first contact charging member and having an at rest state in which the second triboelectric material layer is substantially not in contact with the conductive layer, the flexible substrate layer also configured to, when an external force is applied thereto, press the second triboelectric material layer to be in contact with the conductive layer and then pull the second triboelectric material layer away from the conductive layer when the external force is no longer applied thereto.

10. The triboelectric generator of claim 9, wherein the planar dielectric core structure comprises acrylic.

11. The triboelectric generator of claim 9, wherein the conductive layer comprises aluminum.

12. The triboelectric generator of claim 9, wherein the flexible substrate layer comprises a polyimide film.

13. The triboelectric generator of claim 9, wherein the second triboelectric material layer comprises a polyamide film.

14. The triboelectric generator of claim 9, wherein the flexible substrate layer and the second triboelectric material layer have a horseshoe shape when in the at rest state.

15. A sensor system for sensing contact with a material that has a first rating on a triboelectric series, comprising:
(a) a planar substrate; and
(b) an array of triboelectric sensor units disposed on the planar substrate;

wherein each of the triboelectric sensor units includes a conductive electrode layer; and Wherein each triboelectric sensor unit comprises:
(i) a first contact charging member having a contact side and an opposite back side, including a material that has a first rating on a triboelectric series, the first contact charging member also having a conductive aspect;
(ii) a second contact charging member that has a second rating on the triboelectric series, different from the first rating, and configured to come into contact with the first contact layer contact charging member and go out of contact with the first contact layer contact charging member; and
(iii) an electrical load electrically coupled to the first contact charging member and to a common voltage so that current will flow through the load after the second contact charging member comes into contact with the first contact charging member and then goes out of contact with the first contact charging member,
a triboelectric material layer disposed on the conductive electrode layer, the triboelectric material layer including a material that has a second rating on the triboelectric series; and a plurality of loads, each electrically coupled to the conductive electrode layer of a different one of the triboelectric sensor units and to a ground, wherein each of the plurality of loads is configured to change state when a current flows therethrough.

16. The sensor system of claim 15, wherein at least one of the first contact charging member and the second contact charging member has an outer surface that comprises a nanoscale texture.

17. The sensor system of claim 15, wherein the first triboelectric material layer comprises a material selected from a group consisting of: PDMS and wherein the conductive electrode layer comprises ITO.

18. The sensor system of claim 14, wherein the second contact charging member comprises human skin.

* * * * *